May 29, 1956      K. KRISCH      2,748,193
MAGNETRONIC CIRCUIT-CONTROLLING DEVICES
Filed May 7, 1951
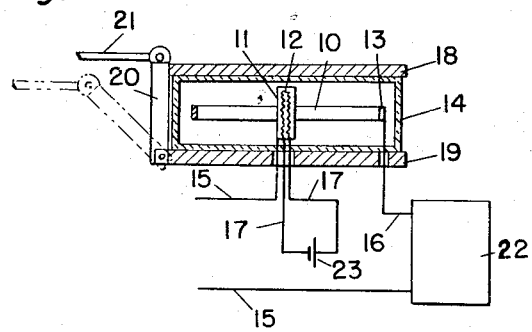
Fig.1
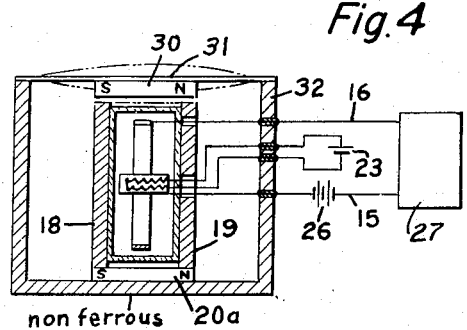
Fig.4
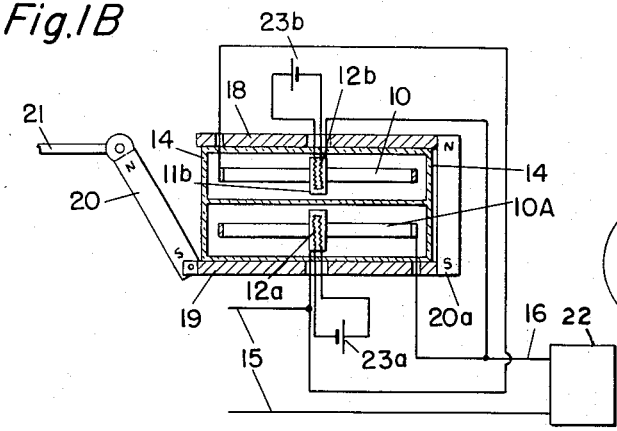
Fig.1B
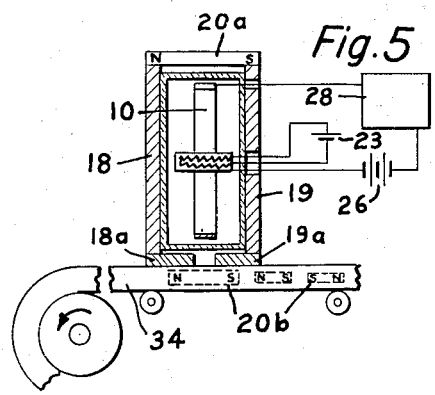
Fig.5
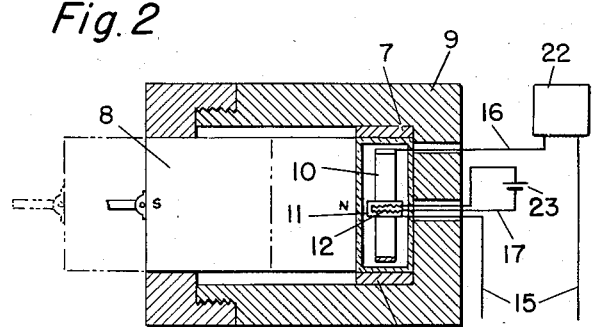
Fig.2
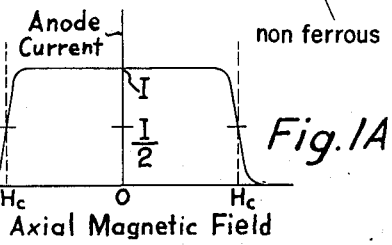
Fig.1A
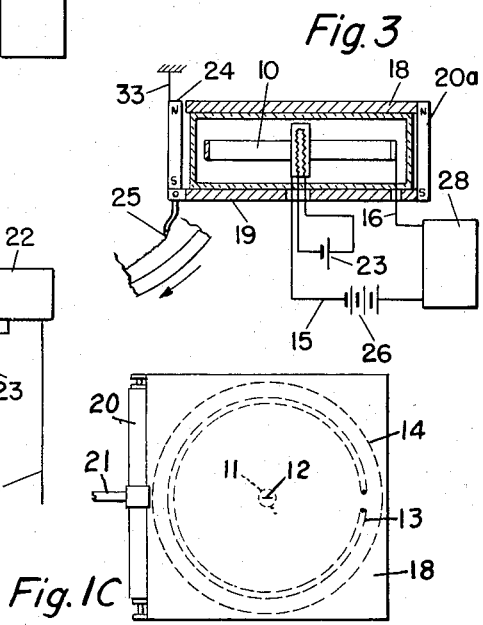
Fig.3
Fig.1C
INVENTOR:
KUBE KRISCH
Woodcock and Phelan
ATTORNEYS United States Patent Office 2,748,198
Patented May 29, 1956

2,748,198

MAGNETRONIC CIRCUIT-CONTROLLING DEVICES

Kube Krisch, Philadelphia, Pa.

Application May 7, 1951, Serial No. 224,980

7 Claims. (Cl. 179—100.2)

This invention relates to magnetronic circuit-controlling devices, and particularly to switches, rheostats, microphones, phonograph pickups and the like embodying tubes of the magnetron type.

In accordance with this invention, the magnetic field across the anode-cathode space of a magnetron is varied about its critical value by movement of a magnetic element either for utilization of the magnetron as a switch or rheostat in circuit with a load and exciting source or as a device translating a variable physical effect into an electrical signal of corresponding magnitude.

Further in accordance with this invention, when the magnetron is used as a rheostat or as a translating device, the major portion of its magnetic field is provided by a stationary magnet and control of the field in the narrow range about its critical value is provided by a relatively small and light movable magnet.

The invention further resides in magnetronic circuit-controlling devices having features of novelty and utility hereinafter described and claimed.

For a more detailed understanding of the invention, reference is had to the figures in which:

Fig. 1 is a schematic illustration of the magnetronic circuit-controlling device utilized as a switch;

Fig. 1A graphically illustrates the current/magnetic-field characteristic of a magnetron;

Fig. 1B is a sectional side view of a magnetronic switch for control of alternating current;

Fig. 1C is a plan view of the embodiment of Fig. 1;

Fig. 2 schematically illustrates a second embodiment of the magnetically-controlled tube utilized as a switch;

Fig. 3 schematically illustrates the magnetically-controlled tube utilized as a phonograph pickup;

Fig. 4 schematically illustrates the magnetically-controlled tube as a transducer; and Fig. 5 schematically illustrates the magnetron tube as a pickup for a magnetic recording.

Referring to Fig. 1, the magnetron 10 includes a cathode 11 heated to emissive temperatures by heater 12, an annular anode 13 positioned concentrically about cathode 11, and evacuated envelope 14 enclosing these elements. The heater current is supplied through leads 17 from a suitable source exemplified by battery 23. The anode-cathode current of the magnetron is supplied from power line 15, 15 through load 22 to be energized or deenergized by use of the magnetron as a fast-acting, flash-proof magnetic switch. Members 18 and 19, respectively disposed on opposite sides of magnetron 10, are of low reluctance magnetic material, such as soft iron, to serve as pole pieces directing a magnetic field, of controlled uniform intensity, across the anode-cathode space of the magnetron within the gap between those pole pieces. The field-producing means may be, as shown in Fig. 1, a permanent magnet 20 attached to magnetic member 19 and adapted to be swung from a position contacting magnetic member 18 to a more remote position shown in dotted outline introducing a second gap in series with the anode-cathode space: alternatively, the field-producing means may be an electromagnet having member 20 as a core. In either event, magnetic member 20 can be moved to any desired position within its range by actuator rod 21 to vary the uniform magnetic field within magnetron 10 over a wide range of intensity.

When magnet 20 is in the solid-line position shown in Fig. 1, a magnetic flux of high intensity will flow in a magnetic circuit or path from magnet 20, through magnetic member 18, across cathode-anode space of magnetron 10, through magnetic member 19 and thence to magnet 20. For such position of magnet 20, the field intensity is sufficient, as below explained, to check current flow through magnetron 10 despite application of the line voltage to its anode and cathode. Hence, for such position of member 20, the load 22 is deenergized.

In brief explanation, with the line voltage applied to cathode 11 and, through load 22, to anode 13, electrons are attracted from cathode 11 to anode 13, so long as the anode potential is positive with respect to the cathode. Such condition is continuously satisfied for a properly poled direct-current source. In moving radially from the cathode toward the anode, the electrons encounter the magnetic field passing from magnetic member 18 to magnetic member 19 and are deflected at right angles to the magnetic field. With the magnetic field of intensity beyond that known as the "critical field" for given magnetron dimensions and applied voltage, the electrons will curve in a sufficiently short-radius path and never reach anode 13. Since the low reluctance pole pieces 18, 19 provide for uniform intensity of the field all around the cathode, substantially all of the emitted electrons return to the cathode. Under such circumstance, existent when the magnetic member 20 is in engagement with, or in close proximity to, pole members 18 and 19, the magnetron is "cut off," i. e., no appreciable plate current flows and load 20 is effectively disconnected from the power line 15, 15.

When magnet 20 is moved to or toward the dotted position of Fig. 1, the reluctance of the aforedescribed magnetic path is greatly increased because of the series gap introduced in the magnetic circuit and the magnetic flux from magnetic member 18 to magnetic member 19 is consequently greatly decreased to another value of uniform intensity. Thus, the magnetic field applied to magnetron 10 may be reduced to a value well below the critical field, so that cathode to anode conduction of electrons occurs and load 22 receives current from the line.

This magnetron switch is particularly suited for heavy loads, including inductive loads, because it avoids the need for large moving contacts with correspondingly massive actuating mechanisms and is also well suited for use in locations where arcing or sparking is hazardous because not requiring any elaborate or bulky arc-extinguishing appurtenances. This circuit-controlling device has the further advantage, it may be used, as below described, as a contactless rheostat for varying the current supplied to load 22.

Fig. 1A graphically illustrates the anode-current/magnetic field relation for either polarity of application of the permanent magnet 20 to magnetic members 18 and 19. It will be seen that over a range of low magnetic fields including zero magnetic field, the anode current of the magnetron stays at a constant value I determined by the interelectrode potentials applied to the magnetron and the physical dimensions thereof. It will be noted that there is a critical magnetic field $H_c$ at which this maximum anode current I is considerably reduced. The transition from maximum current I through an intermediate value to substantially zero occurs very sharply, i. e., the transition occurs over a very small range of change in the magnetic field. For the purpose of this description, the value of the critical magnetic field is shown as midway through the transition, at current ½ I. This critical field H𝚌 is a comparatively large magnetic field in the order of 10 or more gauss. Once it has been determined that a given polarity of magnetic field is to be utilized, the curve of Fig. 1A need be considered only for values to one side of zero. In this embodiment, the permanent magnet 20 is considered to be applied to magnetic members 18 and 19 in polarity such as to produce magnetic fields to the right of zero in Fig. 1A.

As appears from Fig. 1A, a progressive control of current instead of simple "on-off" control can be effected by movement of magnet 20. At some intermediate position, magnet 20 will produce, through the magnetron, a field of intensity H𝚌 which allows about half the anode's maximum current to flow. Consequently, movement of magnet 20 in a limited range about such a position will result in smooth variation of the current through load 22 between maximum and zero values respectively existent when all electrons reach the anode and when all electrons are returned to the cathode.

Since the total magnetic field H𝚌 is comparatively large and the range over which current varies linearly with changes in magnetic field is comparatively small, magnet 20 would have to be moved with considerable precision in a small part of its total range to exert such current-regulating control. At least for a comparatively massive permanent magnet, such movement may involve mechanical complications. Accordingly, a second stationary permanent magnet or the core of an electromagnet can be applied between magnetic members 18 and 19 at their ends opposite that end to which magnet 20 is applied, which second permanent magnet would be applied in the same polarity as for magnet 20. For the polarity of magnet 20 above assumed, the north pole of this second magnet 20a (Fig. 1B) would be applied to magnetic member 18 and the south pole would be applied to member 19. The strength of this second magnet could be selected or adjusted so that it supplies most of critical magnetic field H𝚌, which arrangement would permit permanent magnet 20 to be a comparatively small magnet required to supply only a slight additional field and the changes in magnetic field about H𝚌. As in the modification of Fig. 1, the low reluctance pole pieces insure that the magnetic field in the annular cathode-anode space is uniform throughout the range of intensity values corresponding with the range of movement of magnet 20.

For most cases where the load is supplied from an alternating-current source, the modification of Fig. 1 shown in Fig. 1B is to be preferred. In this modification, one magnetron 10 is connected in series with the load as in Fig. 1 and is shunted by a second magnetron 10A of opposite anode-cathode poling. Thus, successive half-waves of one polarity are conducted to the load 22 by magnetron 10 and the successive half-waves of opposite polarity are conducted to the load by magnetron 10A. As in Fig. 1, the load can be effectively connected to or disconnected from power line 15, 15 by movement of magnetic member 20 between positions for which the intensity of the magnetic field through the magnetrons is respectively suitably above and below the "critical" value.

When the device is also to be used as a rheostat, it is desirable, as above described, that a second fixed magnet 20a be provided to supply most of the field so that a small movable magnet 20 will provide, over a reasonably large range of movement, smooth control of the current from zero to maximum values. As shown in Fig. 1B, the poling of the magnets should be such that their poles of one polarity should coact with pole or armature member 18 and their poles of the opposite polarity should coact with the other pole or armature member 19.

Additional control may be provided in Figs. 1 and 1B by placing a control grid concentrically about and close to cathode 11 of each magnetron. Such grid would serve to limit the electron-flow in magnitude, and to determine the size of a virtual cathode created by the electron cloud developed around cathode 11. Both of these effects would improve the control capabilities of the tubes. The magnitude of these effects may be varied by adjustment of the grid bias to raise or lower the maximum load current obtainable by movement of member 20 for switching control and to shift the range of current values within which smooth variation of load current is obtainable by movement of member 20 for rheostat control.

Another embodiment utilizing a magnetron as an electronic switch is illustrated in Fig. 2. In this modification, a magnet 8, positioned in low reluctance frame 9, is movable therein from one position close to magnetron 10, also contained in frame 9, to a second position more remote from magnetron 10. Frame 9 is preferably a cylindrical housing of internal diameter somewhat greater than the external diameter of the magnetron and magnet 8 is of circular cross-section with a diameter somewhat less than the internal diameter of the housing. When magnet 8 is in close proximity to magnetron 10, the uniform magnetic field then existent in the annular anode-cathode space is in excess of critical field H𝚌 and the magnetron current is cut off for reasons above discussed. When magnet 8 is moved to the broken-line position, the uniform magnetic field then existent in the anode-cathode space of magnetron 10 is considerably less than critical field H𝚌 and magnetron 10 will conduct current I from line 15 through the serially-connected load 22. Thus, by movement of the magnet 8 from one to the other of these positions, the load 22 may be connected to or disconnected from the supply line.

As with Fig. 1, magnet 8 may be positioned in some intermediate position such that the axial field through magnetron 10 is equal to H𝚌 (Fig. 1A) and so reduce the current to one-half the maximum value. For slight movement of magnet 8 within a range about this intermediate position, the current through the load may be smoothly varied within the range of zero and maximum values. As in the modifications of Figs. 1 and 1B, the uniformity of the magnetic field in the anode-cathode space is maintained throughout the range of adjustment of field intensity by the control magnet.

While the magnetron switch devices of Figs. 1, 1B and 2 have been described as evacuated to high vacuum for some high-current applications, it may be desirable to use a gas or vapor to provide positive ions which permit considerably higher currents. For these high-current types of magnetically-controlled electron switches, considerably stronger magnetic fields will be required to produce the necessary deflections of positive ions of the gas or vapor. The magnetic field for "cut-off" must deflect the path of the ions into arcs of sufficiently small radius to miss the electrodes and thereby to cut off the current through the tube.

In description of the preceding figures, it has been pointed out that the magnet may be moved to effect smooth variation of current. If, therefore, the magnet is vibrated, as at audio frequencies, the current through load 22 would have a component of corresponding frequency. By scaling down such modifications, they can, therefore, be used as vibration-pickup devices and like transducers.

In the modification shown in Fig. 3, the magnetic structure 24 is pivotally mounted upon fixed pole member 19 for vibration by a phonograph needle 25, or other contour-following device toward and from the member 19 to vary the magnetron current in accordance with the needle movement.

Spring 33 is provided to bias magnet 24 if it is to produce all of the magnetic field, i. e., the critical field H𝚌 and the variations therein. This bias is to prevent magnet 24 from experiencing an over-powering attraction to member 18 and closing the gap therebetween, thereby rendering the pickup inoperable. Alternatively, or in addition, the adjacent face of fixed member 18 may be provided with a thin layer or coating of non-magnetic material to preclude sticking.

As above described, an additional, stationary magnet 20a can be utilized to provide most of the critical field $H_c$, in which case magnet 24 need provide only a slight field for variation of the current along the linear slope of the current field curve (Fig. 1A). When magnet 20a is used, spring 33 can be a very weak resilient centering means for magnet 24. In either case, the motion of magnet 24 in response to forces applied to needle 25 produces changes in the magnetic field through magnetron 10 which in turn produces changes in the anode current therethrough and provides a useful output to load 28. This useful output can be applied as a signal to an amplifier, to a loudspeaker or other useful load. As in the preceding modifications, the movement of the control magnet does not distort the magnetic field in the anode-cathode space: such movement varies the intensity of the uniform field between the low reluctance pole pieces 18, 19.

In the modification of Fig. 4, the moving magnet 30 is mounted on a resilient diaphragm 31 positioned on the frame of a transducer 32 for vibration in close proximity to magnetic members 18 and 19 which enclose or embrace magnetron 10 as described in connection with Figs. 1 to 3 to provide uniformity of the magnetic field throughout the anode-cathode space for all positions of the movable magnet. The second magnet 20a, as described in previous figures, provides most of the critical magnetic field $H_c$ for magnetron 10. A smaller magnet 30 brings the total field up to the value $H_c$, but due to its freedom to move with diaphragm 31 produces changes in the magnetic field about the value $H_c$ when diaphragm 31 moves in response to pressure impinging thereon or to forces developed by acceleration of transducer 32.

Sound waves striking diaphragm 31 will cause motion of magnet 30, which in turn produces variations in the magnetic field through the magnetron 10, which variations occur about critical magnetic field $H_c$. This variation in magnetic field produces a variation in cathode to anode electron flow of magnetron 10, and this current is applied through leads 15 and 16 to any suitable load such as an amplifier or measuring instrument 27.

Similarly, change in static pressure on the diaphragm will cause a static change in current; also forces developed by acceleration of transducer 32 will cause diaphragm movement and so cause changes in current which are proportional to that acceleration. Hence, the embodiment of Fig. 4 is useful as a microphone, a pressure gage, a depth gage, an acceleration gage, and as a vibration meter. By allowing an air or liquid stream to impinge on diaphragm 31, an air speed meter or flow meter is provided.

With magnet 20a inducing, for example, a north pole in member 19 and a south pole in member 18, magnet 30 will experience little or no attraction to members 18 and 19 because the north pole of magnet 30 will "see" a north pole in member 19 and the south pole of magnet 30 will "see" a south pole in member 18. Accordingly, magnet 30 can vibrate to a position in close proximity to members 18 and 19. However, when magnet 20a is not utilized and magnet 30 must alone provide the critical field $H_c$ as well as the changes therein, then a strong attraction will develop between magnet 30 and members 18 and 19. This attraction will vary roughly in accordance with an inverse square of their separation. In such an embodiment, diaphragm 31 would be required to bias magnet 30 away from members 18 and 19 sufficiently to overcome this attraction at the position of farthest excursion of magnet 30 toward members 18 and 19. For most purposes, it is desirable that magnet 20a be utilized.

In the preceding modifications, the variation of the uniform magnetron field about its critical value has been effected by movement of a single magnetic member with respect to the magnetron armature members 18, 19. Such variation may also be effected by continuous movement past members 18, 19 of a magnetic member or structure comprising a series or succession of magnets. Such a magnetic structure is provided in sound recordings on magnetic tape or wire. Fig. 5 illustrates the use of a recording tape 34 for varying the intensity of the uniform magnetic field of a magnetron in accordance with this invention. In Fig. 5, the tape 34 is seen "edge-on," in greatly enlarged scale for clarity of the illustration. Actual thickness is small. Magnetized tape 34 could be drawn past members 18 and 19 of Figs. 1 and 3 (magnets 20, 24 omitted), but this would not be very satisfactory for reproduction of a wide frequency range. To narrow the gap across which the magnetic fields of tape 34 can influence magnetron 10, auxiliary magnetic members 18a and 19a are appended to members 18 and 19, decreasing the gap across which the magnetic field of tape 34 is applied to the order of a few thousandths of an inch. As with tape 34, the dimensions of the gap are greatly enlarged and out of proportion, for clarity of illustration. This narrowing of the magnetic gap serves primarily to increase the useful frequency range of the pickup, because increasingly shorter magnets within tape 34 can be sensed and can effectively vary the intensity of the uniform magnetic field within magnetron 10. These increasingly shorter magnets will occur within tape 34 when the frequency recorded is increased, i. e., the higher the audio frequency recorded at a given speed of tape 34, the shorter the successive magnets 20B produced within tape 34.

The fixed magnet 20a of the magnetic pickup of Fig. 5 applies a comparatively strong magnetic field across the air gap between members 18a and 19a, which strong magnetic field tends to erase any magnetic recording on tape 34 by virtue of its ability to align the magnet elements thereof and to saturate tape 34 with a steady magnetism, thereby erasing any variation in magnetism which had been recorded thereon. In short, the pickup head also serves as an erasing head.

What is claimed is:

1. A circuit-controlling device comprising a non-oscillatory vacuum tube having a thermally-emissive cathode and an anode concentric therewith, and magnetic means including pole pieces of low reluctance for producing magnetic flux traversing the anode-cathode space of said tube and essentially all of which is unidirectional and continuously in fixed direction substantially parallel to the common axis of said anode and cathode and continuously of uniform intensity axially of said anode-cathode space, said magnetic means including a magnetic control member movable with respect to said low reluctance pole pieces to vary the intensity of the uniform flux through the tube so to vary the anode-cathode current of the tube while maintaining said axial uniformity and fixed direction of the magnetic flux.

2. A circuit-controlling device as in claim 1 in which the magnetic means includes a magnet fixedly mounted with respect to said tube and supplying part of said magnetic flux in amount substantially corresponding with the critical value for said tube, and in which the movable magnetic control member is a second magnet movable in response to an applied force and acceleration to vary the total magnetic flux about said critical value while maintaining the aforesaid axial uniformity and fixed direction of the magnetic flux.

3. A circuit-controlling device as in claim 1, in which the movable magnetic member is a length of flexible magnetizable record.

4. A circuit-controlling device comprising a vacuum tube having an axially-located cathode and an anode concentric to said cathode, and magnetic means including pole pieces of low reluctance for producing a magnetic flux essentially all of which is continuously of uniform intensity axially of the anode-cathode space of said tube and there continuously of fixed direction substantially parallel to the axis of said tube, said magnetic means including a control magnet movable with respect to said pole pieces to vary the reluctance of a gap in series with said anode-cathode space so to vary the intensity of the flux traversing said anode-cathode space while maintaining the aforesaid uniformity thereof axially of the tube and while maintaining the aforesaid fixed direction thereof.

5. A circuit-controlling device comprising a magnetron-type tube having a flow of electrons from cathode to anode proportional to interelectrode potentials; a magnetic circuit including pole pieces of low reluctance providing a first gap across which a uniform magnetic flux traverses the anode-cathode space of said tube in fixed direction normal to said electron flow, a control magnet spaced from at least one of said pole pieces to provide at least one air gap external to the tube and included in said magnetic circuit in series with said first gap; and means for moving said magnet in response to an applied signal to vary the reluctance of said external gap and so modify the intensity of said magnetic flux in said anode-cathode space while said pole pieces there maintain uniformity of the flux in said fixed direction.

6. A circuit-controlling device as in claim 5 in which the control magnet is mechanically connected to and driven by a diaphragm responsive to air waves whereby the electron flow is varied in accordance therewith by the variations in intensity of said uniform magnetic flux of fixed direction.

7. A circuit-controlling device as in claim 5 in which the control magnet is responsive to acceleration and to static displacements to vary the electron flow in accordance therewith by variations in intensity of said uniform magnetic flux of fixed direction.

References Cited in the file of this patent

UNITED STATES PATENTS

| | | | |
|---|---|---|---|
| 841,387 | De Forest | Jan. 15, | 1907 |
| 1,617,172 | Smith | Feb. 8, | 1927 |
| 1,660,321 | Bodde | Feb. 28, | 1928 |
| 1,673,681 | Hull | June 12, | 1928 |
| 1,720,824 | Donle | July 16, | 1929 |
| 1,836,569 | Benjamin | Dec. 15, | 1931 |
| 1,807,097 | Bodde | May 26, | 1931 |
| 1,882,449 | Ruben | Oct. 11, | 1932 |
| 2,139,238 | Linder | Dec. 6, | 1938 |
| 2,142,192 | Ilberg | Jan. 3, | 1939 |
| 2,142,345 | Broden | Jan. 3, | 1939 |
| 2,165,307 | Skellet | July 11, | 1939 |
| 2,352,657 | Potts | July 4, | 1944 |
| 2,473,820 | Richards | June 21, | 1949 |
| 2,509,780 | O'Dea | May 30, | 1950 |